(12) United States Patent
El-Qasem

(10) Patent No.: US 11,656,601 B2
(45) Date of Patent: May 23, 2023

(54) METHOD AND ELECTRONIC GENERATION DEVICE FOR GENERATING AT LEAST ONE CONFIGURATION FILE FOR AN AUTOMATION TOOL, RELATED COMPUTER PROGRAM

(71) Applicant: ATOS IT SERVICES UK LIMITED, London (GB)

(72) Inventor: Tareq El-Qasem, Sale (GB)

(73) Assignee: ATOS FRANCE, Bezons (FR)

(*) Notice: Subject to any disclaimer, the term of this patent is extended or adjusted under 35 U.S.C. 154(b) by 383 days.

(21) Appl. No.: 16/884,213

(22) Filed: May 27, 2020

(65) Prior Publication Data
US 2020/0379435 A1 Dec. 3, 2020

(30) Foreign Application Priority Data
May 29, 2019 (EP) .................................... 19177402

(51) Int. Cl.
| | |
|---|---|
| H04L 12/00 | (2006.01) |
| G05B 19/408 | (2006.01) |
| G06F 16/11 | (2019.01) |
| G06F 16/185 | (2019.01) |
| H04L 41/08 | (2022.01) |
| H04L 41/084 | (2022.01) |

(52) U.S. Cl.
CPC ........ *G05B 19/4083* (2013.01); *G06F 16/116* (2019.01); *G06F 16/185* (2019.01); *H04L 41/08* (2013.01); *H04L 41/084* (2013.01); *G05B 2219/31101* (2013.01); *G05B 2219/31229* (2013.01)

(58) Field of Classification Search
USPC .................................................. 709/220–222
See application file for complete search history.

(56) References Cited

U.S. PATENT DOCUMENTS

| | | | |
|---|---|---|---|
| 7,293,255 B2 | 11/2007 | Kumar | |
| 2004/0268298 A1* | 12/2004 | Miller ....................... | G06F 8/60 |
| | | | 717/106 |

(Continued)

OTHER PUBLICATIONS

Search Report for European Application No. 19177402.5 dated Nov. 18, 2019.
Examination Report issued in EP19177402.5 dated May 18, 2022.

*Primary Examiner* — Frantz Coby
(74) *Attorney, Agent, or Firm* — Arc IP Law, PC; Joseph J. Mayo

(57) ABSTRACT

This method for generating at least one configuration file for an automation tool in order to configure the automation tool, is implemented by an electronic generation device and comprises the following steps: receiving (100) an automation tool type, selecting (110), according to the automation tool type, a predetermined configuration file model from a group of predetermined configuration file models, each predetermined configuration file model being associated to a respective automation tool, each predetermined configuration file model comprising a plurality of input objects, —determining (120) a hierarchy of the input objects from the predetermined configuration file model, the hierarchy defining, for each input object except for a root object, another input object as a parent for said input object, generating (130) the configuration file according to the hierarchy of the input objects.

12 Claims, 3 Drawing Sheets

(56) References Cited

U.S. PATENT DOCUMENTS

2010/0058330 A1\* 3/2010 DeHaan .................... G06F 8/60
717/177
2010/0250907 A1\* 9/2010 DeHaan .................... G06F 8/60
713/1

\* cited by examiner

METHOD AND ELECTRONIC GENERATION DEVICE FOR GENERATING AT LEAST ONE CONFIGURATION FILE FOR AN AUTOMATION TOOL, RELATED COMPUTER PROGRAM

CROSS-REFERENCE TO RELATED APPLICATIONS

This application is a U.S. non-provisional application claiming the benefit of European Application No. 19177402.5, filed on May 29, 2019, which is incorporated herein by reference in its entirety.

FIELD OF THE INVENTION

The present invention relates to a method for generating at least one configuration file for an automation tool in order to configure the automation tool, the method being implemented by an electronic generation device.

The invention also relates to a non-transitory computer-readable medium including a computer program comprising software instructions which, when executed by a computer, implement such a method.

The invention also relates to an electronic generation device for generating at least one configuration file for an automation tool in order to configure the automation tool.

BACKGROUND OF THE INVENTION

This invention concerns the field of the configuration of automation tools. Automation tools are used for various applications, such as for installation, configuration or on-going maintenance of a computer infrastructure, a set of storage device(s), a set of networking device(s), a set of security device(s), a set of software application(s), a cloud environment, an application test environment or a data input system. Such automation tools are for example: Packer©, AWS CloudFormation©, Terraform©, Ansible©, Google Cloud Platform Deployment Manager©, Docker© and Puppet©. In order to configure an automation tool for a specific application, configuration files are used. These configuration files are typically manually created by a user for the corresponding automation tool and its application.

However, the creation of such configuration files is often time intensive. At the same time, the configuration files are often prone to syntax errors which may be difficult to identify.

The document U.S. Pat. No. 7,293,255 B2 concerning a clustered computer system describes a method for automatically generating a configuration file for an installation on nodes on the clustered computer system. However, the method described in U.S. Pat. No. 7,293,255 B2 may not always be reliable when generating a configuration file for a specific automation tool.

SUMMARY OF THE INVENTION

An object of the invention is thus to provide a method and a related electronic generation device for generating at least one configuration file for an automation tool that allow faster generation of configuration files, while being more reliable.

For this purpose, the subject-matter of the invention is a method for generating at least one configuration file for an automation tool in order to configure the automation tool, the method being implemented by an electronic generation device and comprising the following steps:

receiving an automation tool type,
selecting, according to the automation tool type, a predetermined configuration file model from a group of predetermined configuration file models, each predetermined configuration file model being associated to a respective automation tool, each predetermined configuration file model comprising a plurality of input objects,
determining a hierarchy of the input objects from the predetermined configuration file model, the hierarchy defining, for each input object except for a root object, another input object as a parent for said input object,
generating the configuration file according to the hierarchy of the input objects.

According to other advantageous aspects of the invention, the method comprises one or several of the following features, taken individually or according to any technically possible combination:

the method further comprises a step of acquiring a value for each input object, and during the generating step, the configuration file further comprises the acquired value for each input object;
the hierarchy corresponds to an order of the input objects in the configuration file;
the hierarchy is in the form of an object tree with the root object forming the top of the object tree;
a format of the configuration file is chosen from the group consisting of: JSON, YAML and XML;
the generated configuration file further depends on specific rules, such as syntax and/or layout rules, associated to the configuration file format;
the automation tool is implemented for installation, configuration or on-going maintenance of an element chosen from the group consisting of: a computer infrastructure, a set of storage device(s), a set of networking device(s), a set of security device(s), a set of software application(s), a cloud environment, an application test environment, a data input system;
the automation tool type is chosen from the group consisting of: Packer©, AWS CloudFormation©, Terraform©, Ansible©, Google Cloud Platform Deployment Manager©, Docker© and Puppet©;
the method further comprises a step of displaying the input objects on a graphical user interface, the displaying step being carried out by subsequently reading each input object according to the hierarchy;
the method further comprises a step of storing in a memory a file comprising a template of the configuration file;
the method further comprises a step of adding at least one input object to the hierarchy according to a format of the configuration file; and
each input object is configured to receive a single respective data type.

The subject-matter of the invention is also a non-transitory computer-readable medium including a computer program comprising software instructions which, when executed by a computer, implement a method as defined above.

The subject-matter of the invention is also an electronic generation device for generating at least one configuration file for an automation tool in order to configure the automation tool, the electronic generation device comprising:

a reception module configured for receiving an automation tool type,
a selection module configured for selecting, according to the automation tool type, a predetermined configuration file model from a group of predetermined configuration file models, each predetermined configuration file model being associated to a respective automation tool, each predetermined configuration file model comprising a plurality of input objects, a determination module configured for determining a hierarchy of the input objects from the predetermined configuration file model, the hierarchy defining, for each input object except for a root object, another input object as a parent for said input object, a generation module configured for generating the configuration file according to the hierarchy of the input objects.

BRIEF DESCRIPTION OF THE DRAWINGS

The invention will be better understood upon reading of the following description, which is given solely by way of example and with reference to the appended drawings, wherein.

DETAILED DESCRIPTION OF PREFERRED EMBODIMENTS

Figure 1:
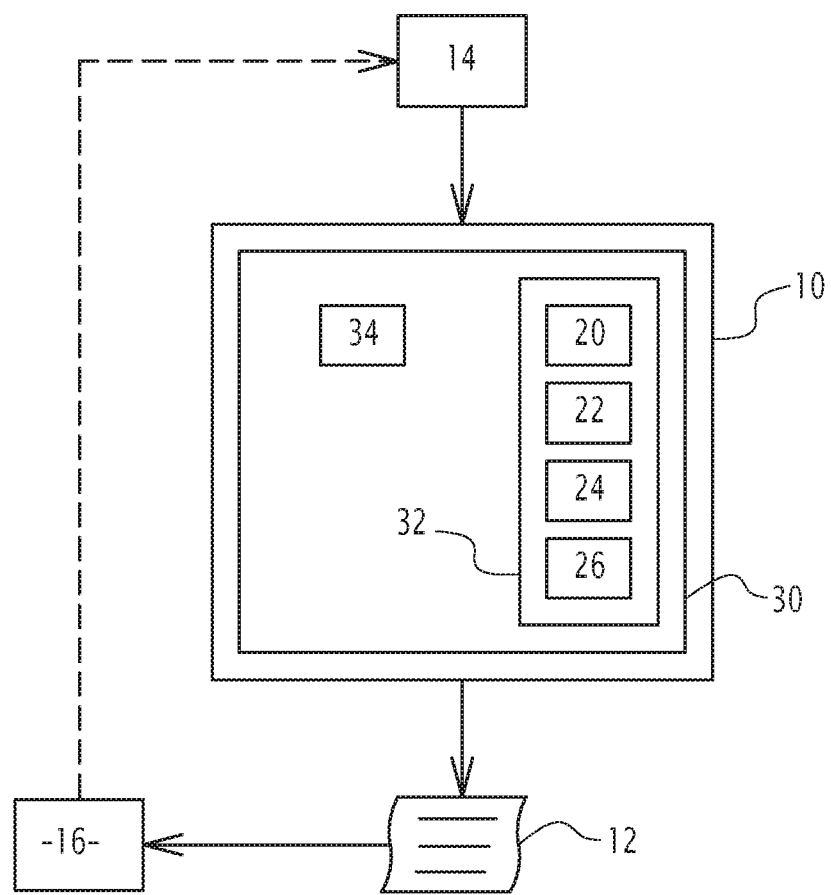
FIG. 1 is a schematic representation of an electronic generation device adapted for generating at least one configuration file for an automation tool.

In FIG. 1, an electronic generation device 10 is configured to generate at least one configuration file 12 for an automation tool 16, notably in function of an automation tool type 14.

The electronic generation device 10 comprises a reception module 20 for receiving the automation tool type 14.

The electronic generation device 10 comprises a selection module 22 for selecting, according to the automation tool type 14, a predetermined configuration file model from a group of predetermined configuration file models, each predetermined configuration file model being associated to a respective automation tool 16, each predetermined configuration file model comprising a plurality of input objects.

The electronic generation device 10 further comprises a determination module 24 for determining a hierarchy of the input objects from the predetermined configuration file model, the hierarchy defining, for each input object except for a root object, another input object as a parent for said input object.

The electronic generation device 10 comprises a generation module 26 for generating the configuration file 12 according to the hierarchy of the input objects.

In the example of FIG. 1, the electronic generation device 10 includes a processing unit 30 formed for example of a memory 32 and of a processor 34 coupled to the memory 32.

In the example of FIG. 1, the reception module 20, the selection module 22, the determination module 24 and the generation module 26 are each realized, i.e. implemented, as a software executable by the processor 34. The memory 32 of the processing unit 30 is adapted to store a reception software for receiving an automation tool type 14, a selection software for selecting a predetermined configuration file model from the group of predetermined configuration file models, a determination software for determining the hierarchy of the input objects from the predetermined configuration file model, and a generation software for generating the configuration file 12 according to the hierarchy of the input objects. The processor 34 of the processing unit 30 is then configured to execute the reception software, the selection software, the determination software and the generation software.

As a variant not shown, the reception module 20, the selection module 22, the determination module 24 and the generation module 26 are each in the form of a programmable logic component, such as a Field Programmable Gate Array or FPGA, or in the form of a dedicated integrated circuit, such as an Application Specific integrated Circuit or ASIC.

When the electronic generation device 10 is in the form of one or more software programs, i.e. in the form of a computer program, it is also capable of being recorded on a computer-readable medium, not shown. The computer-readable medium is, for example, a medium capable of storing electronic instructions and being coupled to a bus of a computer system. For example, the readable medium is an optical disk, a magneto-optical disk, a ROM memory, a RAM memory, any type of non-volatile memory (for example EPROM, EEPROM, FLASH, NVRAM), a magnetic card or an optical card. A computer program with software instructions is then stored on the readable medium.

The configuration file 12 is a computer file specific to a corresponding automation tool 16. The configuration file 12 describes a workflow that is to be applied by the respective automation tool 16 in order to configure the automation tool 16.

The format of the configuration file 12 depends, in particular, on the automation tool 16 to be configured by the configuration file 12. For example, the format of the configuration file 12 is the JSON format (from "JavaScript Object Notation"), the YAML format (from "YAML Ain't Markup Language") or the XML format (from "Extensible Markup Language"). The JSON format is an open-standard file format that uses human-readable text to transmit input objects comprising attribute-value pairs and array data types (or any other serializable value). The YAML format is a human-readable language for the configuration files 12. The XML format is a markup language that defines a set of rules for encoding computer files in a format that is both human-readable and machine-readable.

Optionally, the configuration file 12 further depends on specific rules, such as syntax and/or layout rules, associated to the configuration file format.

The automation tool type 14, i.e. the type of the automation tool 16, is for example any type of automation tool 16 that is implemented for installation, configuration or on-going maintenance of one of the following elements: a computer infrastructure, a set of storage device(s), a set of networking device(s), a set of security device(s), a set of software application(s), a cloud environment, an application test environment, a data input system.

For example, the automation tool type 14 is one of the following types of automation tool 16: Packer© (trademark of HashiCorp, Inc.), AWS CloudFormation© (of Amazon Web Services, Amazon), Terraform© (trademark of HashiCorp, Inc.), Ansible© (trademark of Redhat), Google Cloud Platform Deployment Manager© (of Google, Inc.), Docker© (trademark by Docker, Inc.) and Puppet© (Open Source by Puppet Labs).

The reception module 20 is configured to receive the automation tool type 14, which has typically been inputted by a user, for example via an input device, not shown, such as a keyboard or a computer mouse.

The selection module 22 is configured to select, from the group of predetermined configuration file models, the predetermined configuration file model, according to the automation tool type 14 received by the reception module 20.

The selection module 22 is configured to select the configuration file model in a format corresponding to the format of the configuration file 12. For example, the selection module 22 is configured to select a configuration file model in JSON format, YAML format or XML format.

Each configuration file model, also called schema or data model, is in particular predefined, or predetermined, for each automation tool type 14. For example, each configuration file model is defined before each operation of the electronic generation device 10.

Each predetermined configuration file model comprises a plurality of input objects. The number and type of the input objects are predetermined for each configuration file model. Each input object presents a parameter or nature of a data to be provided for the generation of the configuration file 12. An input object comprises for example an IP address of a website to be used by the automation tool 16, a user name, a password, a name of a cluster of computers, a name of a template of a configuration file 12 to be used, communication encryption data, a hardware processing speed or a memory capacity.

The determination module 24 is configured to determine the hierarchy of the input objects from the predetermined configuration file model. In particular, the determination module 24 is configured to read the input objects from the configuration file model and to build the hierarchy.

The determination module 24 is configured to determine the position of each input object in the hierarchy, by respecting specific rules associated to the predetermined configuration file model, such as syntax and/or layout rules.

The hierarchy corresponds to an order of the input objects in the configuration file 12. The order is for example governed by the configuration file model in line with the requirements of the automation tool and would usually be grouped in relevance to a specific task or object being automated.

In the case of a configuration file for Packer to automate a VMWare vSphere virtual machine creation, the order of the input objects is for example the following one: type of the virtual machine, such as vSphere; name of a server for the virtual machine; username; password; flag (true or false) for insecure connection; name of a datacenter for the virtual machine; name of a template for the virtual machine; name of the virtual machine; name of a folder; name of a cluster; IP address of an host; name of resource pool; name of a data store; flag (true or false) for a linked clone; number of CPU; capacity reservation for the CPU; capacity limit for the CPU; size of the RAM; size reservation for the RAM; SSH username; SSH password; command, such as a Unix command, for shutdown of the virtual machine; shutdown timeout; flag (true or false) for creation of a snapshot; flag (true or false) for conversion to template.

Usually, the order is optional as the automation tool would read the whole file in first and have its own order of execution and in turn read the required parameter by querying the name of the parameter to read its value. For example, the first step of execution would be to authenticate (log in) on the system, to automate it the automation tool would need the username and password values. These could be stored at the bottom of the configuration file or in any order.

The hierarchy comprises a root object and a plurality of input objects that depend from the root object. The root object is a typically not an input object, but just a parameter to denote it's the root.

For example, the hierarchy is in the form of an object tree with the root object forming the top of the object tree.

The hierarchy defines, for each input object except for the root object, another input object as a parent for said input object. For example, the hierarchy defines a plurality of input objects forming parent input objects and a plurality of input objects forming child input objects, each child input object depending directly only on its respective parent input object.

In optional addition, the hierarchy which is in the form of the object tree includes hierarchies of parent and child objects where parameters are part of a group of parameters. Indeed, in the example above with the configuration file for Packer to automate a VMWare vSphere virtual machine creation, there might be a situation where you want to automate many VMWare vSphere environments at the same time. To do this, there are for example have numerous entries for that same automation task, but for different end points. The example below shows two child objects of type "vsphere" for vSphere, which contain the input objects for a single end point and they belong to the "builders" object, i.e. the root object, and the input objects inside each are child objects of the vSphere object.

```
"builders": [
    {
        "type": "vsphere",
        "vcenter_server": "vcenter6.vcloudplanet.com",
        "username": "PackerAdmin@vsphere.local",
        "password": "",
        "insecure_connection": "true",
        "datacenter": "ManchesterDC",
        "template": "templates/CentOS7",
        "vm_name": "atos-centos7-{{timestamp}}",
        "folder": "VMs",
        "cluster": "Cluster1",
        "host": "192.168.1.70",
        "resource_pool":"",
        "datastore": "GoldLun",
        "linked_clone": "false",
        "CPUs": 1,
        "CPU_reservation": 1000,
        "CPU_limit": 2000,
        "RAM": 4096,
        "RAM_reservation": 4096,
        "ssh_username": "root",
        "ssh_password": "",
        "shutdown_command": "echo 'password123' | sudo -S shutdown -P now",
        "shutdown_timeout": "5m",
        "create_snapshot": "true",
        "convert_to_template": "true"
    },
    {
        "type": "vsphere",
        "vcenter_server": "vcenter7.vcloudplanet.com",
        "username": "PackerAdmin@vsphere.local",
        "password": "",
        "insecure_connection": "true",
        "datacenter": "LondonDC",
        "template": "templates/CentOS7",
        "vm_name": "atos-centos7-{{timestamp}}",
        "folder": "VMs",
        "cluster": "Cluster2",
        "host": "192.168.1.72",
        "resource_pool": "",
        "datastore": "GoldLun",
        "linked_clone": "false",
        "CPUs": 1,
        "CPU_reservation": 1000,
```

```
            "CPU_limit": 2000,
            "RAM": 4096,
            "RAM_reservation": 4096,
            "ssh_username": "root",
            "ssh_password": "",
            "shutdown_command": "echo 'password123' | sudo -S
            shutdown -P now",
            "shutdown_timeout": "5m",
            "create_snapshot": "true",
            "convert_to_template": "true"
        }
    ]
```

The generation module 26 is configured to generate the configuration file 12 according to the hierarchy of the input objects. The generation module 26 is in particular configured to read subsequently each input object of the hierarchy and to generate a text block corresponding to each input element. The generation module 26 is configured to generate the configuration file 12 by adding gradually the text blocks to the configuration file 12, according to an order imposed by the hierarchy.

In optional addition, the generation module 26 is configured to store in a memory, not shown, a file comprising a template of the configuration file 12. A template is an intermediate or a final version of a configuration file 12 comprising text blocks fulfilling, i.e. complying with, the specific rules of the format of the configuration file 12. The generation module 26 is configured to store such a template in view of a later use when generating another configuration file 12.

In optional addition, the generation module 26 is further configured to add at least one input object to the hierarchy according to the format of the configuration file 12. For example, the generation module 26 is configured to receive a user input indicating one or more input objects to add to the hierarchy.

In optional addition, the generation module 26 is further configured to acquire a value for each input object. The value is associated to the nature of data or parameter of the respective input object. The value is for example a numerical value, a series of alphabetic characters or a combination of numerical values and an alphabetic characters. For example, each value is constraint according to the input object.

For example, each input object is configured to receive a single respective data type. For example, for an input objet being the CPU speed, the data type of the value is required to be a numerical value, which is representative for the CPU speed.

The configuration module 26 is configured to include the acquired value for each input object into the configuration file 12.

According to a variant, a value is pre-attributed to a corresponding input object. A pre-attributed value is also called prepopulated value.

Figure 2:
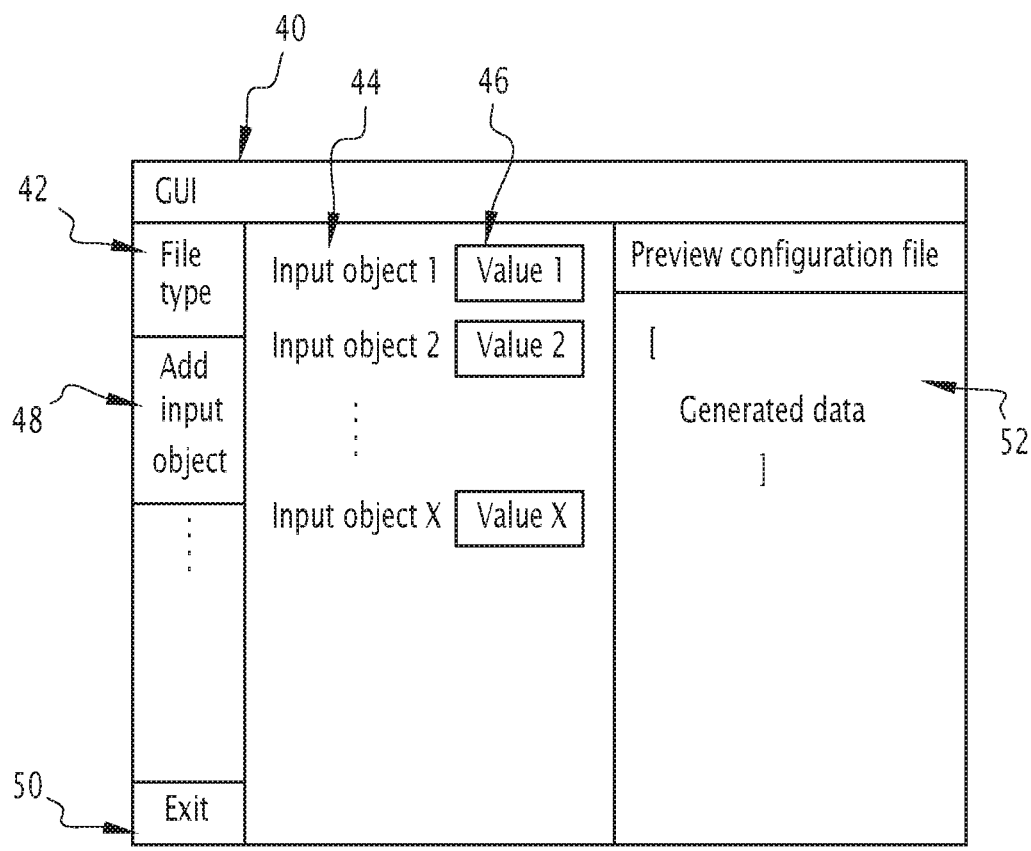
FIG. 2 is a schematic representation of a graphic user interface implemented and displayed by the electronic generation device of FIG. 1.

The generation module 26 is further configured to display the input objects on a graphical user interface 40 as shown in FIG. 2. The generation module 26 is configured to subsequently read each input object according to the hierarchy, and to display each input object via the graphical user interface 40. For example, the generation module 26 is configured to apply a recursive algorithm by traversing the object tree comprising the input objects, in view of displaying of each input object.

With reference to FIG. 2, the graphical user interface 40 (abbreviated "GUI" in the FIG. 2), comprises a plurality of buttons and fields.

The graphical user interface 40 comprises a "File type" button 42 configured to allow the user choosing the automation tool type 14.

The graphical user interface 40 comprises a plurality of input object fields 44 and a plurality of value fields 46. Each input object field 44 represents an input object according to the selected configuration file model. The input object fields 44 are for example checkboxes, textboxes, number-pickers, tables or pull-down menus. Each value field 46 comprises the value associated to the respective input object field 44.

According to a variant, for example in case of a high number of input object fields 44, the graphical user interface 40 comprises a tabulated view comprising several tabs, each tab representing a group of input object fields 44 and its corresponding value fields 46.

In optional addition, the graphical user interface 40 comprises additional buttons providing various additional functionalities. In the example of FIG. 2, the graphical user interface 40 comprises an "Add input object" button 48 and an "Exit" button 50. The "Add input object" button 48 allows the user to request for adding input objects via the generation module 26. The "Exit" button 50 allows the user to exit the graphical user interface 40. The graphical user interface 40 is adapted to display added input objects in the form of input object fields 44, along with corresponding value fields 46.

The graphical user interface 40 comprises a preview zone 52 configured to represent a preview of the configuration file 12. In particular, the graphical user interface 40 is configured to show the generated data of the configuration file 12, i.e. the text in the YAML, JSON or XML format.

Figure 3:
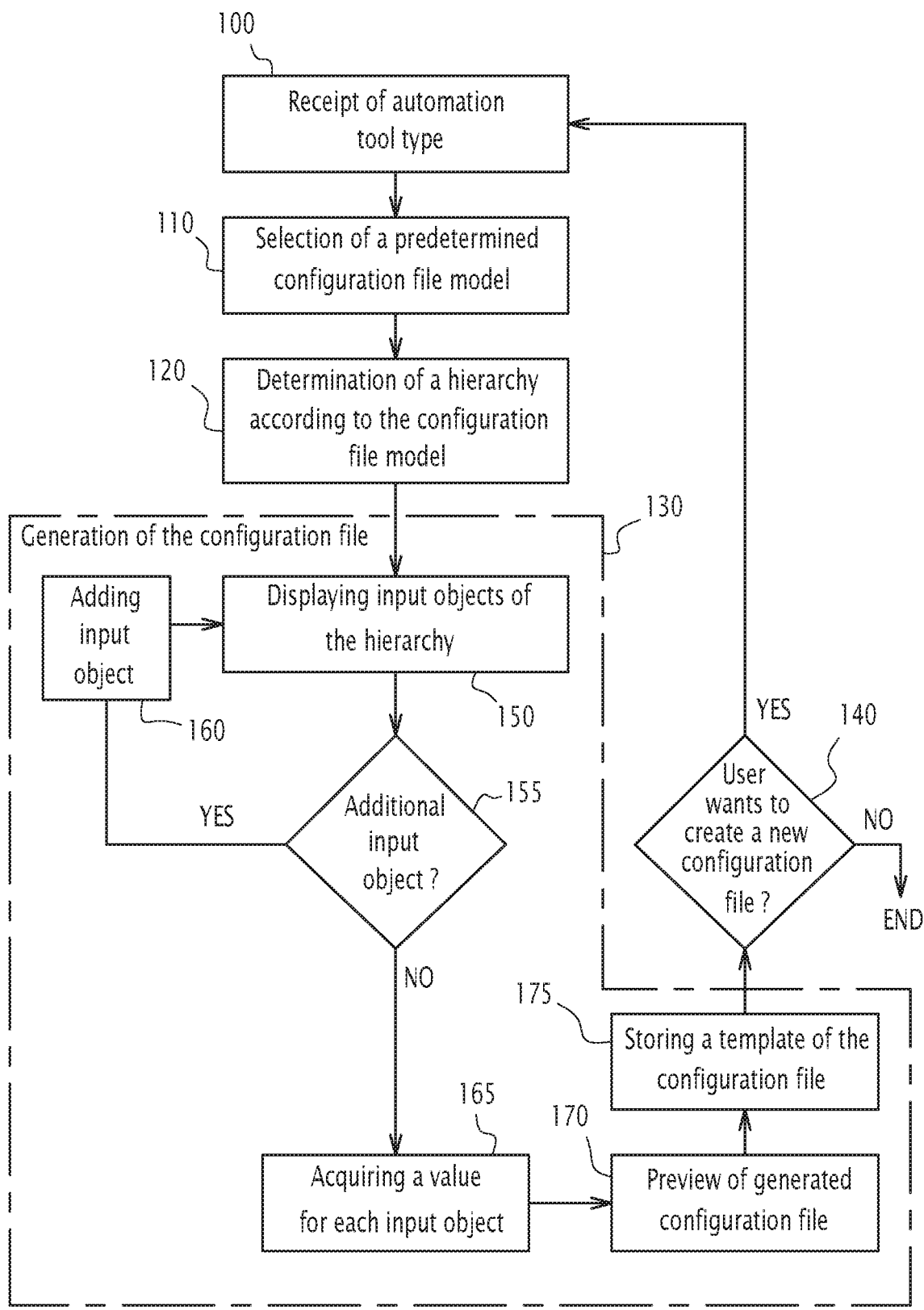
FIG. 3 is a flowchart of a method, according to the invention, for generating at least one configuration file for an automation tool, the method being implemented by the electronic generation device of FIG. 1.

The operation of the electronic generation device 10 according to the invention will now be explained in view of FIG. 3 representing a flowchart of a method, according to the invention, for generating at least one configuration file 12 for the automation tool 16.

In an initial step 100, the reception module 20 receives the automation tool type 14. For example, the automation tool type 14 for which a configuration file 12 is to be generated has been inputted by a user, for example via an input device, not shown, such as a keyboard or a computer mouse.

In the next step 110, the selection module 22 selects, according to the automation tool type 14 received by the reception module 20, a predetermined configuration file model from the group of predetermined configuration file models.

For example, if the automation tool type 14 is associated to a single configuration file model, the selection module 22 selects this configuration file model. If the automation tool type 14 is associated to a plurality of configuration file models, the selection module 22 is configured to select one of the configuration file models, for example according to an additional input from the user.

The selection module 22 selects in particular the configuration file model in a format corresponding to the format of the configuration file 12, for example in JSON format, YAML format or XML format.

In the next step 120, the determination module 24 determines the hierarchy of the input objects from the predetermined configuration file model. The determination module 24 reads the input objects from the configuration file model and builds the hierarchy. In particular, the determination module 24 determines the position of each input object in the hierarchy, by respecting specific rules associated to the predetermined configuration file model, such as syntax and/or layout rules.

In the next step 130, the generation module 26 generates the configuration file 12 according to the hierarchy of the input objects. The generation module 26 reads subsequently each input object of the hierarchy and generates a text block corresponding to each input element. The generation module 26 adds sequentially the text blocks to the configuration file 12, according to the order imposed by the hierarchy.

According to an example, the generation module 26 starts from the root object of the hierarchy, descends the hierarchy and reads a parent object and then all child objects of the parent object by generating text blocks corresponding to each input object that is subsequently read. Then, the generation module 26 reads another parent object and all child objects of that parent object by generating the corresponding text blocks. The generation module 26 then continues by reading the next parent input object and the corresponding child input objects and so on.

If the hierarchy comprises more than three levels, for example, starting from the root object, parent input objects, child input objects, and grandchild input objects, the generation module 26 reads each input object according to the order of the hierarchy. For example, the generation module 26 reads a parent input object, then all child objects of the parent input object, and then all grandchild input objects of all read child input objects, and so on.

At the end of generation step 130, the configuration file 12 is completed and ready for use in the corresponding automation tool 16.

In the next step 140, the electronic generation device 10 checks whether the user wants to create another configuration file 12. For example, the electronic generation device 10 provides the choice of generating another configuration file 12 via the graphical user interface 40 to the user. If the user wants to generate another configuration file 12, the method restarts at initial step 100. If the user does not want to create another configuration file 12, the method is finished, and the user selects the "Exit" button 50.

Optionally, the generation step 130 comprises one or several additional sub-steps 150, 155, 160, 165, 170 and 175.

In sub-step 150, the generation module 26 displays the input objects on the graphical user interface 40, as shown in FIG. 2. The generation module 26 subsequently reads each input object according to the hierarchy, and then displays each input object on the graphical user interface 40. For example, the generation module 26 applies a recursive algorithm by traversing the object tree comprising the input objects, in view of displaying each input object.

In sub-step 155, the generation module 26 checks whether the user wants to add one or more additional input object(s), for example by displaying on the graphical user interface 40 a corresponding choice.

In a variant of sub-step 155, the user selects the "Add input object" button 48 in order to add one or more input object(s).

For example, the sub-step 155 is implemented after sub-step 150.

If the user wants to add one or more additional input object(s), i.e. if the test of the sub-step 155 is positive, the sub-step 160 is implemented. If the user does not want to add one or more additional input object(s), .e. if the test of the sub-step 155 is negative, the sub-step 165 is then implemented.

In sub-step 160, the user chooses the input object to be added, for example from a set of suggested additional input objects, and the generation module 26 adds the input object to the hierarchy according to a format of the configuration file 12. The generation module 26 adds, for example, also the value fields 46 corresponding to the added input variables. Then, the generation module 26 returns to sub-step 150 for displaying the input objects, now including the additional input object(s).

In sub-step 165, the generation module 26 acquires the value for each input object. The configuration module 26 includes the acquired value for each input object into the configuration file 12.

The generation module 26 implements sub-step 165 notably, after the sub-step 155, if the user does not wish to add (any more) additional input objects.

The sub-step 165 is omitted for prepopulated values corresponding to a specific input object. For example, the sub-step 170 is implemented after the sub-step 155 for prepopulated values and if the user does not want to add one or more additional input object(s).

In optional addition or in variant, the sub-step 165 is implemented before the sub-steps 155 and 160. For example, the generation module 26 acquires the value for each input object, then checks whether the user wants to add one or more additional input object(s), the user chooses the input object(s) to be added, and then the generation module 26 acquires the value(s) for each added input object.

In sub-step 170, the generation module 26 shows a preview of the generated configuration file 12, in particular in the preview zone 52 of the graphical user interface 40. The graphical user interface 40 shows the generated data of the configuration file 12, i.e. the text in the YAML, JSON or XML format.

In the example of the method in FIG. 3, the sub-step 170 is implemented after sub-step 165. Optionally, the sub-step 170 is implemented several times during the method. For example, sub-step 170 is implemented after sub-step 150, i.e. after each addition of an additional input variable.

In sub-step 175, the generation module 26 stores in the memory, not shown, a file comprising a template of the configuration file 12. The generation module 26 stores such a template in view of a later use when generating another configuration file 12, for example after step 140.

In the example of FIG. 3, the sub-step 175 is implemented after sub-step 170. Optionally, the sub-step 170 is implemented several times during the method, for example each time when an additional input variable is added.

One can thus see that the method for generating at least one configuration file 12 and the electronic generation device 10 according to the invention make it possible to allow a faster generation of configuration files 12, while being more reliable at. The determination of the hierarchy of the input objects from the predetermined configuration file model allows to avoid potential errors in the format of the configuration file 12. The method also allows to generate the configuration file 12 very fast.

What is claimed is:

1. A method for generating at least one configuration file for an automation tool in order to configure the automation tool, the method being implemented by a computer and comprising:
   receiving an automation tool type,
   selecting, according to the automation tool type, a predetermined configuration file model from a group of predetermined configuration file models, wherein
   each predetermined configuration file model of the group of predetermined configuration file models being associated to a respective automation tool, each predetermined configuration file model of the group of predetermined configuration file models comprising a plurality of input objects, each input object of the plurality of input objects presenting a parameter to be provided for the generating the at least one configuration file, determining a hierarchy of the plurality of input objects from the group of predetermined configuration file models, the hierarchy being in a form of an object tree with a root object forming a top of the object tree, the object tree defining, for said each input object except for the root object, another input object as a parent for said each input object and including hierarchies of parent and child objects where parameters are part of a group of parameters, generating the at least one configuration file according to the hierarchy of the plurality of input objects, comprising reading said each input object of the hierarchy, generating a text block corresponding to each input element and gradually adding the text block to the at least one configuration file, according to an order imposed by the hierarchy.

2. The method according to claim 1, further comprising acquiring a value for said each input object, and wherein, during the generating the at least one configuration file, the at least one configuration file comprises the value that is acquired for said each input object.

3. The method according to claim 1, wherein the hierarchy corresponds to an order of the plurality of input objects in the at least one configuration file.

4. The method according to claim 1, wherein a format of the at least one configuration file is chosen from a group consisting of: JSON, YAML and XML.

5. The method according to claim 4, wherein the at least one configuration file that is generated depends on specific rules, wherein said specific rules comprise one or more of syntax rules and layout rules, associated to the format of the at least one configuration file.

6. The method according to claim 1, wherein the automation tool is implemented for installation, configuration or on-going maintenance of an element chosen from a group consisting of: a computer infrastructure, at least one storage device, at least one networking device, at least one security device, at least one software application, a cloud environment, an application test environment, a data input system.

7. The method according to claim 1, wherein the automation tool type is chosen from a group consisting of: Packer©, AWS CloudFormation©, Terraform©, Ansible©, Google Cloud Platform Deployment Manager©, Docker© and Puppet©.

8. The method according to claim 1, further comprising displaying the plurality of input objects on a graphical user interface, the displaying being carried out by subsequently reading said each input object according to the hierarchy.

9. The method according to claim 1, further comprising storing a template of the at least one configuration file in a memory file.

10. The method according to claim 1, further comprising adding at least one input object of the plurality of input objects to the hierarchy according to a format of the at least one configuration file.

11. The method according to claim 1, wherein said each input object is configured to receive a single respective data type.

12. A non-transitory computer-readable medium including a computer program comprising software instructions which, when executed by a computer, implement a method for generating at least one configuration file for an automation tool in order to configure the automation tool, the method being implemented by a computer and comprising:

receiving an automation tool type, selecting, according to the automation tool type, a predetermined configuration file model from a group of predetermined configuration file models, wherein each predetermined configuration file model of the group of predetermined configuration file models being associated to a respective automation tool, each predetermined configuration file model of the group of predetermined configuration file models comprising a plurality of input objects, each input object of the plurality of input objects presenting a parameter to be provided for the generating the at least one configuration file, determining a hierarchy of the plurality of input objects from the group of predetermined configuration file models, the hierarchy being in a form of an object tree with a root object forming a top of the object tree, the object tree defining, for said each input object except for the root object, another input object as a parent for said each input object and including hierarchies of parent and child objects where parameters are part of a group of parameters, generating the at least one configuration file according to the hierarchy of the plurality of input objects, comprising reading said each input object of the hierarchy, generating a text block corresponding to each input element and gradually adding the text block to the at least one configuration file, according to an order imposed by the hierarchy.

* * * * *